(12) United States Patent
Kudo

(10) Patent No.: US 8,380,853 B2
(45) Date of Patent: *Feb. 19, 2013

(54) METHOD AND APPARATUS FOR LOCATING CANDIDATE DATA CENTERS FOR APPLICATION MIGRATION

(75) Inventor: Yutaka Kudo, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,168

(22) Filed: Jun. 20, 2011

(65) Prior Publication Data

US 2011/0252135 A1    Oct. 13, 2011

Related U.S. Application Data

(63) Continuation of application No. 12/871,037, filed on Aug. 30, 2010, now Pat. No. 7,991,893, which is a continuation of application No. 11/987,284, filed on Nov. 29, 2007, now Pat. No. 7,801,994.

(51) Int. Cl.
*G06F 15/16* (2006.01)
(52) U.S. Cl. ............ 709/226; 709/202; 707/609; 718/1; 718/100
(58) Field of Classification Search .................. 709/202, 709/226; 707/609; 718/1, 100
See application file for complete search history.

(56) References Cited

U.S. PATENT DOCUMENTS

| 7,062,559 | B2 | 6/2006 | Yoshimura et al. |
| 7,099,912 | B2 | 8/2006 | Ishizaki et al. |
| 7,801,994 | B2 | 9/2010 | Kudo |
| 2009/0055507 | A1 | 2/2009 | Oeda |

FOREIGN PATENT DOCUMENTS

| JP | 2006092519 | 6/2006 |
| JP | 2006244481 | 9/2006 |
| JP | 2007518169 | 5/2007 |

OTHER PUBLICATIONS

Khanna et al. "application Performance Management in Virtualized Server Environments" IEEE, 2006, pp. 373-381.*
Grit et al. "Virtual Machine Hosting for Networked Clusters: Building the Foundations for "Autonomic" Orchestration" IEEE, 2006, VTDC '06 Proceedings pp. 1-8.*
JP Office Action in JP Application No. 2008-158715, dated Jul. 31, 2012.

* cited by examiner

*Primary Examiner* — David Lazaro
(74) *Attorney, Agent, or Firm* — Mattingly & Malur, PC

(57) ABSTRACT

When an application running at a first data center needs to be migrated to a different data center, the first data center is able to automatically locate an appropriate target data center from among multiple other data centers for receiving the migration of the application. The first data center ensures that a specified level of performance of the application will be maintained following migration of the application by preparing a migration request document that specifies network requirements, server requirements and storage requirements for the application. A targeted data center that is a candidate for receiving migration of the application receives the specified requirements and uses a performance index and other analysis to determine whether its hardware, software and other configurations are capable of meeting the specified requirements. The results of the determination are sent back to the requesting data center, which then decides if migration will be carried out.

12 Claims, 13 Drawing Sheets

| 601 | 602 | 603 | 604 | 605 | 606 |
|---|---|---|---|---|---|
| VPN-ID | Site | Address 1 (Site IP Address) | Address 2 (Virtual Router IP Address) | Bandwidth (Mbps) | VLAN-ID |
| VR-001 | Site-001 | IP(Site-001) | IP(VR-001) | 1.5 | VID-001 |
| VR-002 | Site-002 | IP(Site-002) | IP(VR-002) | 1.5 | VID-002 |
| VR-003 | Site-003 | IP(Site-003) | IP(VR-003) | 1.5 | VID-003 |
| VR-004 | Site-004 | IP(Site-004) | IP(VR-004) | 1.5 | VID-004 |
| Free | - | - | - | 2.0 | |

VPN Resource Table 311

| Virtual Machine Manager | Virtual Server | Physical Server | CPU Type | CPU Allocation | Memory Allocation | Performance Capacity | VLAN-ID |
|---|---|---|---|---|---|---|---|
| VMM-001 | VM-101 | PS-001 | CPU-001 | 100% | 4G | 100 | VID-001 |
| | VM-102 | PS-002 | CPU-001 | 75% | 4G | 75 | VID-002 |
| | VM-103 | PS-002 | CPU-001 | 25% | 2G | 25 | VID-003 |
| | VM-104 | PS-003 | CPU-001 | 15% | 2G | 15 | VID-001 |
| | Free | PS-003 | CPU-001 | 85% | 4G | 185 | |
| | | PS-004 | CPU-001 | 100% | | | |
| VMM-002 | VM-201 | PS-005 | CPU-001 | 85% | 4G | 85 | VID-002 |
| | VM-202 | PS-005 | CPU-001 | 15% | 2G | 35 | VID-003 |
| | | PS-006 | CPU-001 | 20% | | | |
| | Free | PS-006 | CPU-001 | 80% | 4G | 80 | |
| VMM-003 | VM-301 | PS-007 | CPU-001 | 40% | 2G | 40 | VID-001 |
| | VM-302 | PS-007 | CPU-001 | 30% | 2G | 30 | VID-003 |
| | VM-303 | PS-007 | CPU-001 | 30% | 2G | 30 | VID-004 |
| NON-VMM | | PS-008 | CPU-001 | 100% | 4G | 100 | VID-004 |
| | | | | | | | |

Virtual Machine Resource Table 411

FIG. 7

|  | 801 | 802 | 803 |
|---|---|---|---|
|  | Virtual Machine Manager | CPU Type | Performance Index |
| 811 | VMM-001 | CPU-001 | 100 |
| 812 | VMM-001 | CPU-002 | 120 |
|  | VMM-001 | CPU-003 | 130 |
|  | ... | ... | ... |
|  | VMM-002 | CPU-001 | 110 |
|  | VMM-002 | CPU-002 | 115 |
|  | VMM-002 | CPU-003 | 112 |
|  | ... | ... | ... |
| 817 | VMM-003 | CPU-001 | 65 |
|  | VMM-003 | CPU-002 | 90 |
|  | VMM-003 | CPU-003 | 95 |
|  | ... | ... | ... |
|  | NON-VMM | CPU-001 | 120 |
|  | NON-VMM | CPU-002 | 125 |
|  | NON-VMM | CPU-003 | 130 |
|  | ... | ... | ... |

CPU Process Time Translation Table 412

FIG. 8

Storage Volume Resource Table 511

| DC ID | Request Destination Address | Request Priority |
|---|---|---|
| DC-001 | http://DC-001/... | 1 |
| DC-002 | http://DC-002/... | 2 |
| DC-003 | http://DC-003/... | 2 |
| DC-004 | http://DC-004/... | 3 |
| ... | ... | ... |

Federated Data Center Table 213

FIG. 10

| ID | Request Origin | Date Request was Received | Network Result | Server Result | Storage Result | Migration Request Contents |
|---|---|---|---|---|---|---|
| MRR-001 | DC-002 | 10/11/2007,00:00:00 | NO | NO | NO | (contents) |
| MRR-002 | DC-003 | 10/13/2007,00:00:00 | NO | YES | YES | (contents) |
| MRR-003 | DC-003 | 11/21/2007,00:00:00 | YES | YES | YES | (contents) |
| MRR-004 | DC-002 | 12/03/2007,00:00:00 | NO | NO | NO | (contents) |
| ... | ... | ... | ... | ... | ... | ... |

Migration Request Received Table 214

FIG. 11A

| ID | Request Target | Date Request was Sent | Network Result | Server Result | Storage Result | Migration Request Contents |
|---|---|---|---|---|---|---|
| MRS-001 | DC-002 | 10/12/2007,00:00:00 | NO | YES | NO | (contents) |
| MRS-004 | DC-002 | 11/03/2007,00:00:00 | NO | NO | NO | (contents) |
| MRS-003 | DC-003 | 11/03/2007,00:00:00 | YES | YES | YES | (contents) |
| ... | ... | ... | ... | ... | ... | ... |
| | | | | | | |

Migration Request Sent Table 215

FIG. 11B

Migration Request Document 13

Processing of VPN Request Part

Processing of Server Request Part

Processing of Storage Request Part

METHOD AND APPARATUS FOR LOCATING CANDIDATE DATA CENTERS FOR APPLICATION MIGRATION

CROSS-REFERENCES

This is a continuation application of U.S. Ser. No. 12/871,037, filed Aug. 30, 2010 (now U.S. Pat. No. 7,991,893), which is a continuation application of U.S. Ser. No. 11/987,284, filed Nov. 29, 2007 (now U.S. Pat. No. 7,801,994), the entire disclosures of which are hereby incorporated by reference.

BACKGROUND OF THE INVENTION

1. Field of the Invention

The present invention relates generally to information systems and data centers.

2. Description of Related Art

Large companies and other enterprises may have multiple information systems and data centers that they use to conduct their business. For example, carriers who provide phone and Internet-related services will generally have multiple geographically-dispersed data centers to cover their service area. These enterprises may be running a variety of different services including voice transmission, e-mail, Internet access, messaging, video streaming, and the like, using networks, servers and storage systems provided by the data centers. Thus, the effective and efficient use of resources such as the networks, servers and storage systems in these data centers is necessary for the successful operation of these enterprises.

Recently, virtualization of networks, servers and storage has increased the efficiency with which data centers can be operated. For example, server virtualization is a technology that enables server consolidation in certain information system arrangements, such as at data centers, by allowing single physical servers to provide a plurality of virtual server environments using virtual machine software. Under this technology, one or more physical servers can be divided into multiple virtual server environments instead of having multiple dedicated physical servers, each running a different server environment. Further, virtual machine software is also able to combine several physical servers to create a single virtual server. Server virtualization can be used to eliminate the requirement for having a large number of different physical servers in a data center, and thereby enable more efficient use of server resources, while improving server availability. Also, server virtualization can help reduce overall costs, reduce power consumption, reduce time for server provisioning, centralize server management and administration, assist in agile service deployment and improve disaster recovery capabilities.

Virtualization technology allows the data center management to change the system configuration dynamically in order to improve performance of applications running in a data center. Furthermore, migration of an application between data centers that are distributed over a wide area can be carried out by forwarding the data which is necessary for running an application. However, problems currently exist for resource provisioning to enable application migration between environments including geographically-dispersed data centers. For example, it is difficult to find an appropriate target data center to which to migrate an application while maintaining the same performance as before the migration because applications typically utilize multiple layers of different technologies including networks, servers and storages. In particular, network devices, server devices and storage devices which are used to operate an application may be different at every data center, and determining available capacity of these devices is not always possible. Therefore, the application may not operate at the same level of performance when operation of the application is moved from a first data center to a different data center. In addition, even when an application can be migrated to the other data center and maintain the same level of performance, the migration may affect the performance of other applications running in the targeted data center. Existing methods are just able to carry out a configuration change within the data center for performance improvement after the applications are migrated.

Related art includes U.S. Pat. No. 7,099,912, to Ishizaki et al., entitled "Integrated Service management system"; U.S. Pat. No. 7,062,559, to Yoshimura et al., entitled "Computer Resource Allocating Method"; and U.S. patent application Ser. No. 11/892,045, to Oeda, filed Aug. 20, 2007, entitled "Storage and Service Provisioning for Virtualized and Geographically Dispersed Data Centers", the entire disclosures of which are incorporated herein by reference.

BRIEF SUMMARY OF THE INVENTION

The invention offers a solution for automatically locating one or more appropriate data centers that are able to run an application according to a current state of performance to enable migration of the application. Embodiments of the invention provide for dynamically changing resource allocation in a data center according to a load on the data center, and maintaining performance and security for each user when the load of a user fluctuates. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 7 illustrates an exemplary data structure of a virtual machine resource table.

FIG. 8 illustrates an exemplary data structure of a CPU process time translation table.

FIG. 10 illustrates an exemplary data structure of a federated data center table.

FIG. 11A illustrates an exemplary data structure of a migration request received table.

FIG. 11B illustrates an exemplary data structure of a migration request sent table.

DETAILED DESCRIPTION OF THE INVENTION

Figure 1:
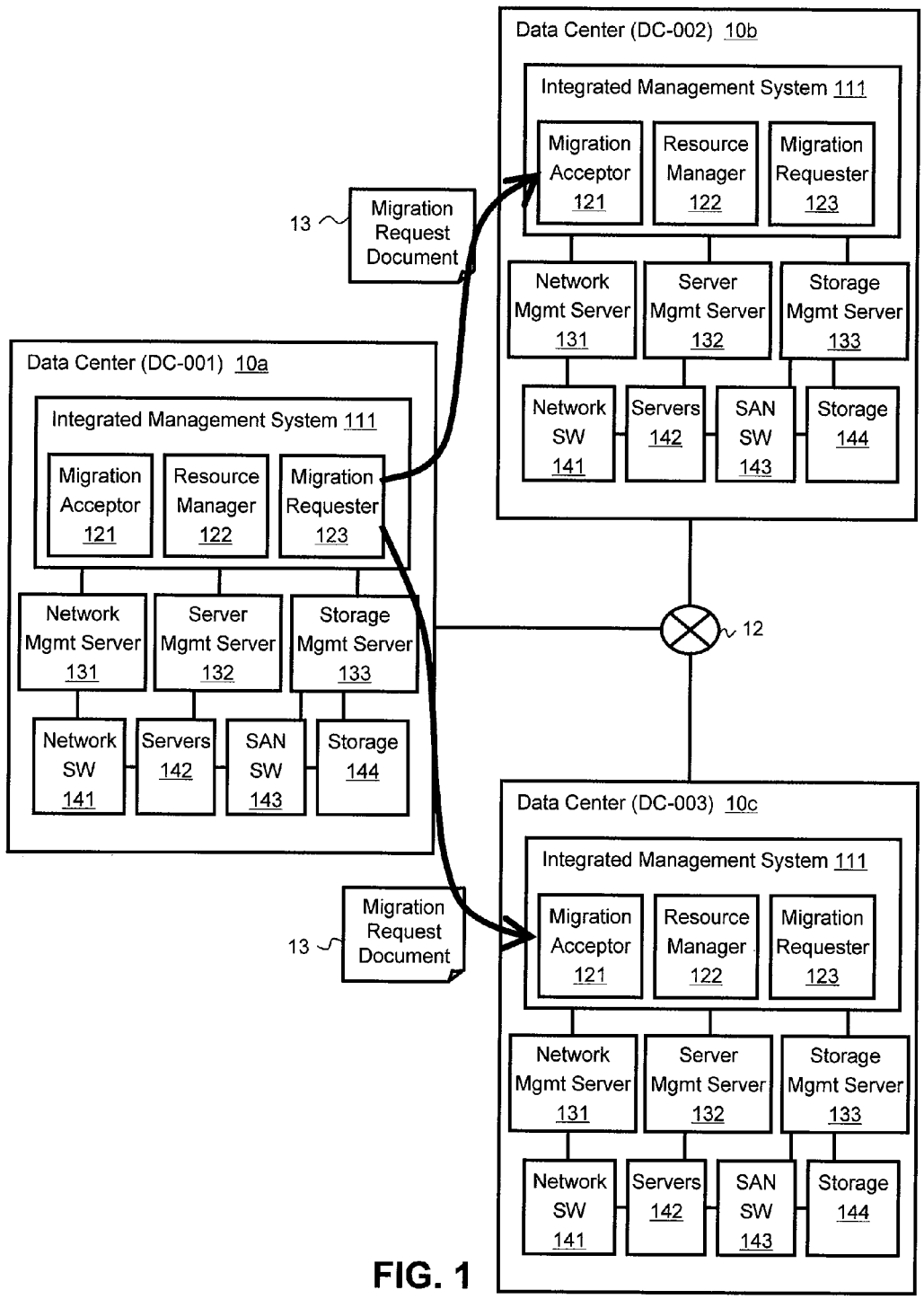
FIG. 1 illustrates an example of a hardware configuration and relationship between multiple data centers in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Appropriate networks, servers and storage systems are necessary for running an application at a proper level of performance. In order to maintain the performance of the application at a certain level, the performance of each of these elements needs to be monitored and maintained. Embodiments of the invention disclose a system and method that confirms whether a data center that is a candidate for receiving migration of an application will be able to maintain the performance of the application if the application is migrated. The invention can achieve this by checking that the data center is able to provide sufficient network bandwidth, sufficient server computing power and adequate storage capacity and access speed from a suitable server.

Embodiments of the invention include an integrated management system that determines whether a certain application can be migrated to another data center by communicating with the integrated management systems of other data centers. The integrated management system generates a migration request document that contains network requirements, server requirements and storage requirements. The migration request document is sent by the originating data center to the other data centers. The integrated management systems of the data centers that receive the migration request documents check the situation of their local environment. Each integrated management system checks the network layer, the server layer and the storage layer. Regarding a network layer, the integrated management system determines whether there is sufficient available bandwidth to meet the specified requirement. Regarding the server layer, the integrated management system determines whether there is a specified virtual machine manager and sufficient available server capacity to meet the specified requirement. Regarding the storage layer, the integrated management system determines whether there are available volumes having free capacity to meet the specified requirement. The integrated management system checks whether the volumes that the application needs to use can be carved from an array group having a similar access performance pattern without having a detrimental influence on other applications that are running at the data center.

Relationships Between Multiple Data Centers

As illustrated in FIG. 1, multiple data centers 10a, 10b, 10c are connected to each other for communication through a network 12. Data centers 10 are typically geographically dispersed from each other, and network 12 may be any network type, including WAN (Wide Area Network), LAN (Local Area Network) or the like. Each data center 10 may comprise an integrated management system 111, a network management server 131, a server management server 132, a storage management server 133, one or more network switches 141, servers 142 for running one or more applications, a SAN switch 143 and storage 144. Network management server 131 manages operation of network switches 141 for communication with clients. Server management server 132 manages operation and configuration of servers 142. Storage management server 133 manages operation and configuration of SAN switch 143 and storage 144.

Integrated management system 111 includes a migration acceptor program 121, a resource manager 122 and migration requester 123. When migration of an application is to be carried out, a migration request document 13 is sent by migration requester 123 of one of data centers 10a, 10b or 10c, and the migration request document 13 is received by migration acceptors 121 of others of data centers 10a, 10b, 10c. Migration request document 13 is processed by resource managers 122 of the receiving data centers. Further, while three data centers 10 are illustrated in FIG. 1, it should be noted that any number of data centers may embodied under the invention.

Hardware Architecture and Software Modules of Data Center

Figure 2:
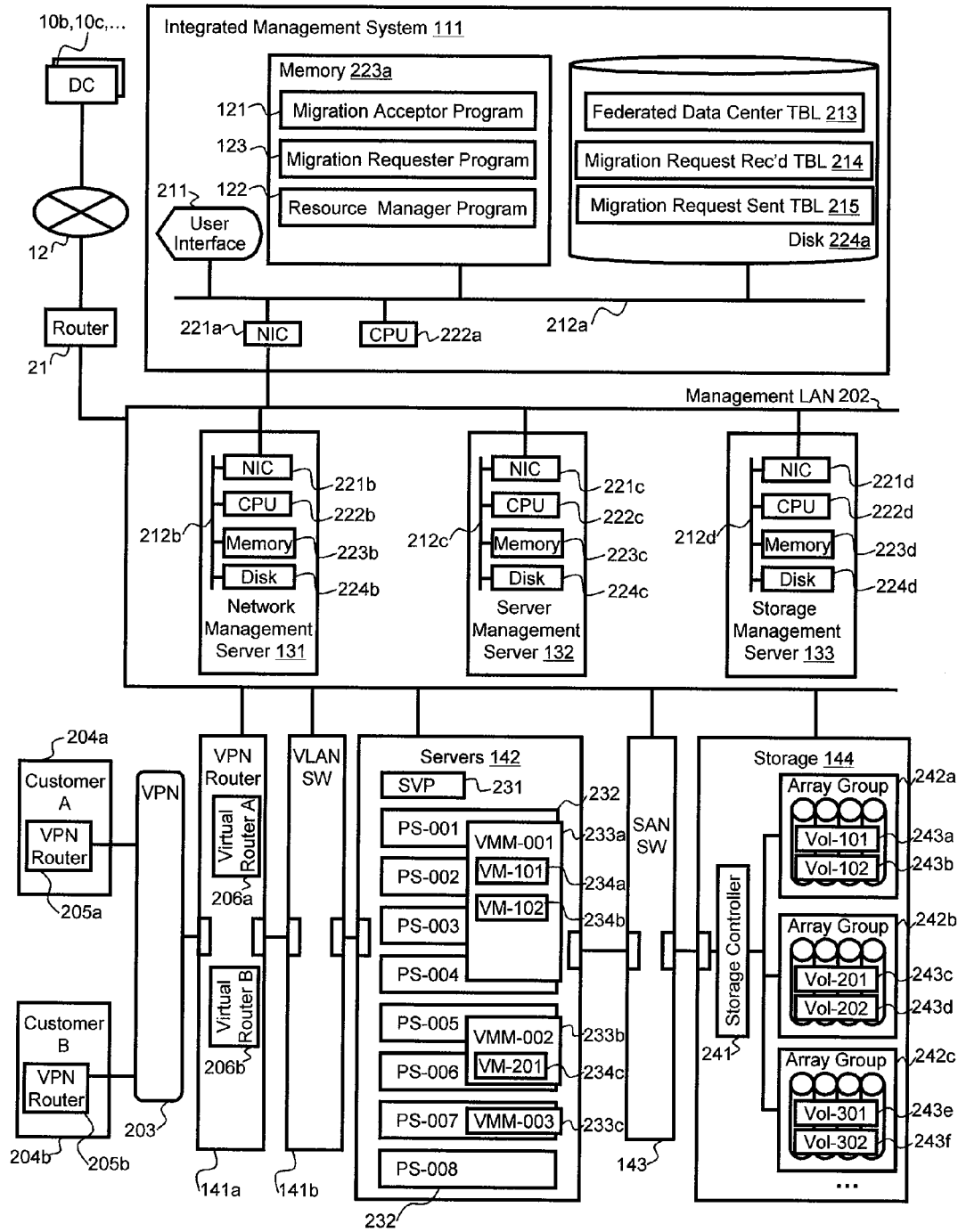
FIG. 2 illustrates an example of a hardware and software configuration of an individual data center.

FIG. 2 illustrates the details of the hardware architecture and software modules that may be contained in each data center 10. As illustrated in FIG. 2, a management LAN 202 connects integrated management system 111, network management server 131, server management server 132, storage management server 133, a VPN (Virtual Private Network) router/switch 141a, a VLAN (Virtual Local Area Network) switch 141b, servers 142, SAN switch 143 and storage 144 to enable communication therewith, and to also enable communication with network 12 via a router 21. Integrated management system 111, network management server 131, server management server 132 and storage management server 133 are generic computers that each include a CPU 222, a memory 223, a NIC (Network Interface Card) 221 and a disk drive 224, which are internally connected through a system bus 212. Integrated management system 111 includes migration acceptor program 121, migration requester program 123 and resource manager program 122, which are loaded in memory 223a or other computer readable medium for execution by CPU 222a. A federated data center table 213, a migration request received table 214, and a migration request sent table 215 are stored in the disk storage 224a, and may also be loaded into memory 223a. Integrated management system 111 includes a user interface 211 that is used for carrying out functions such as sending a migration request or displaying managed data of the data center to an administrator, or the like.

Network switches 141 may include VPN router 141a that enables realization of a virtual private network (VPN) 203. Virtual private network service provides a secure network path between a customer site 204 and the data center 10 of the service provider over a shared public network such as the Internet. Each VPN service customer has one or more sites to be connected to the VPN. One end point of a VPN path is a VPN router 205 at a customer's site, and the other end point of the VPN path is on the VPN router 141a, which resides in the data center 10. VPN router 141a in the data center 10 aggregates multiple VPN paths, identifies the customer by VPN ID, and directs the traffic received from the customer to the virtual LAN VLAN switch 141b.

Within the VPN router 141*a*, multiple virtual router (VR) programs 206 may be running, each serving different VPN customers. For example, in FIG. 2, the VPN paths from customer site A 204*a* are terminated at the virtual router A 206*a* in VPN router 141*a*. Similarly, the VPN paths from customer site B 204*b* are connected to the virtual router B 206*b*. Because each virtual router 206 has its own routing table and other network resources dedicated to the particular customer it serves, packets from each VPN customer are clearly separated from the network point of view. This allows, for example, two different customers to use the same overlapping IP address spaces within a private address range. When a virtual router A 206*a* receives packets from the VPN path of customer A 204*a*, virtual router A 206*a* then adds to these packets a VLAN tag for customer A and sends the packets to the VLAN switch 141*b*. A VLAN tag is information added to the LAN frame so that more than two logically independent networks are able to be overlaid on the same LAN segment. A more detailed specification and discussion of the user of VLAN tags is defined in the IEEE 803.1Q standard published by IEEE (Institute of Electrical and Electronics Engineers, Inc.), which is incorporated herein by reference. The technology to manage the quality of service is, for example, MPLS (Multi Protocol Label Switching) DiffServ (Differentiated Services) which is defined by the IETF (Internet Engineering Task Force).

Servers 142 include one or more physical servers 232 and a service processor (SVP) 231. In the embodiment illustrated, there are eight physical servers 232, labeled PS-001 to PS-008, although the number of physical servers 232 can vary. Multiple virtual machine managers (VMMs) 233 are available and, in embodiments of the invention, customers can choose one of these on which to run their applications. In FIG. 2, virtual machine managers VMM-001 233*a*, VMM-002 233*b* and VMM-003 233*c* are shown as being available. The roles carried out by virtual machine managers 233 include combining plural physical servers into one virtual server and dividing one physical server into plural virtual servers. For example in FIG. 2, VMM-001 combines four physical servers PS-001 to PS-004 and then divides the resources of these four physical servers into two virtual servers (virtual machines) VM-101 234*a* and VM-102 234*b*. Also, VMM-002 233*b* combines physical servers PS-005, PS-006, and has one virtual server VM-201 234*c* active thereon, while VMM-003 233*c* is only active on physical server PS-007. On the other hand, physical server PS-008 is a raw physical server that does not have virtualization applied thereto.

The virtual machine managers 233 are able to assign the CPU power and memory of the server(s) they control according to the customer needs. For example, each virtual or physical server belongs to a certain VLAN. However, as VLAN switch 141*b* on the VLAN segment is configured to transfer VLAN-tagged packets from VPN router 141*a* to an appropriate server connected to the VLAN segment, it is not necessary for servers to know which VLAN they belong to. Further, each virtual or physical server has one or more host bus adapters (HBAs) (not shown) that are connected to the storage area network (SAN), i.e., to SAN switch 143. From the SAN point of view, each virtual or physical server is identified by its HBA address or port. In the configuration of FIG. 2, each virtual or physical server is connected to the SAN switch 143.

Storage 144 includes one or more storage systems providing multiple logical storage volumes 243 for use by servers 142. Each volume 243 may be carved from an array group 242 that may be composed as a RAID (Redundant Array of Independent Disks). In some embodiments, each array group 242 can be composed by different types of disks and/or different levels of RAID, thereby providing different levels of performance. In FIG. 2, volumes Vol-101 243*a* and Vol-102 243*b* are carved from array group 242*a*, volumes Vol-201 243*c* and Vol-202 243*d* are carved from array group 242*b*, and volumes Vol-301 243*e* and Vol-302 243*f* are carved from array group 242*c*. Each array group 242 is controlled by storage controller 241. Virtual servers 234, physical servers 232 and storage volumes 243 may be connected via a storage area network (SAN), which may be Fibre Channel, or other type of connection. In FIG. 2, SAN switch 143 is used to connect servers 232, 234 and volumes 243 as a SAN. To segregate servers and volumes for different customers, SAN switch 143 and/or storage volumes 242 may be configured so that access to a specific storage volume is restricted to a specific virtual server 234 or physical server 232. For SAN switches, this security functionality is called "port zoning", while for storage devices, this security functionality is often called "LUN security", where "LUN" stands for logical unit number. From the performance point of view, volumes which have similar access patterns are desired to be on the same array group. The word "access pattern" here refers to a read/write access ratio and a random/sequential access ratio.

Typically, an application can be run on its own virtual server 234. For example, a first application might be run on VM-101 234*a* and a second application might be run on VM-102 234*b*, and so forth. The first application might use virtual router A 206*a* and the second application might use virtual router B 206*b*. Further, the first application might use volumes Vol-101 234*a* and Vol-102 243*b*, while the second application might use volumes Vol-201 243*c* and Vol-202 243*d*. Thus, through virtualization, network, server and storage resources can be apportioned to various applications. Embodiments of the invention automatically locate suitable candidate data centers to receive migration of an application, for example, if a data center where the application is currently being operated is overloaded, or if migration of an application otherwise becomes necessary or desirable.

Figure 3:
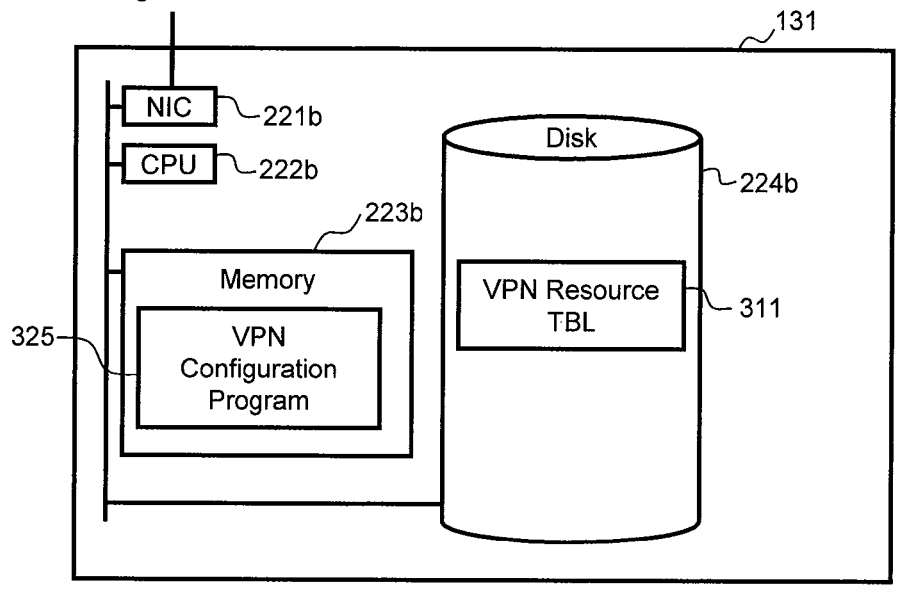
FIG. 3 illustrates an example of a network management server.

FIG. 3 illustrates additional details of network management server 131. NIC network interface card 221*b* of network management server 131 is connected to the management LAN 202 and is used to send or receive command packets to or from integrated management system 111. Network management server 131 also includes a VPN configuration program 325 loaded in memory 223*b*, or other computer readable medium, which is executed by CPU 222*c*. VPN configuration program 325 communicates with VPN router 141*a* for configuring VPN router 141*a*, including the creation of virtual routers 206. The information for mapping between VPN path, VLAN tags associated with the information, and network bandwidth information are stored in a VPN resource table 311 in disk 224*b*. The contents of the VPN resource table 311 are described further below with reference to FIG. 6.

Figure 4:
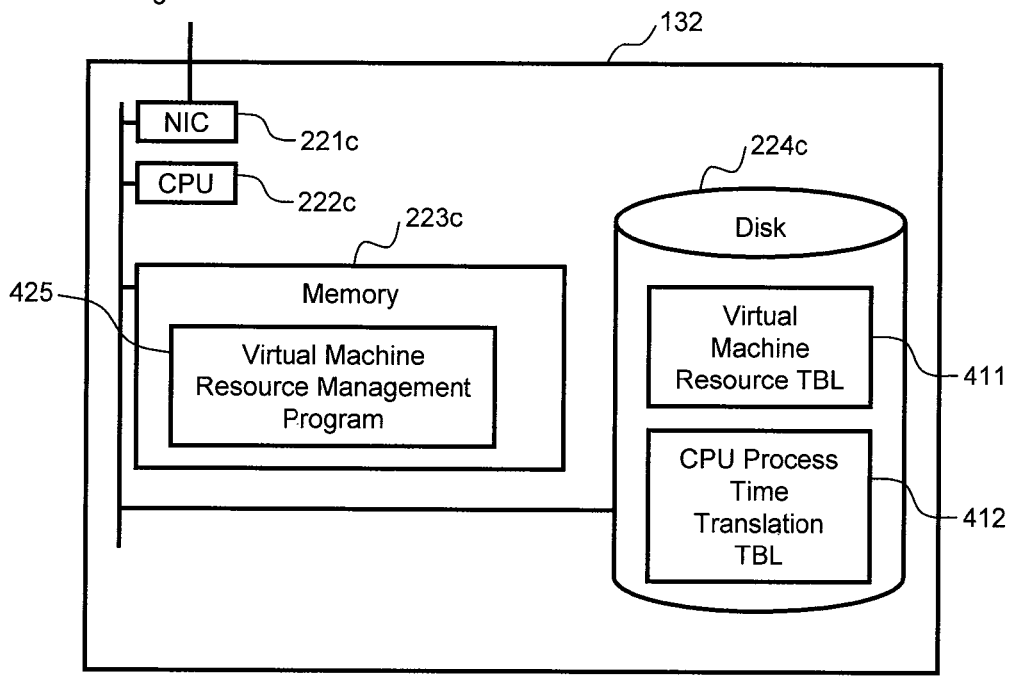
FIG. 4 illustrates an example of a server management server.

FIG. 4 illustrates additional details of the server management server 132. NIC 221*c* connects server management server 132 to the management LAN 202, and is used to send or receive command packets to or from integrated management system 111. Server management server 132 includes a virtual machine resource management program 425 in memory 223*c* or other computer readable medium, which is executed by CPU 222*c*. Virtual machine resource management program 425 communicates with VLAN switch 141*b* to configure the VLAN settings. Virtual machine resource management program 425 also communicates with one or more virtual machine managers 233 on servers 142 to manage virtual servers 234. Management of virtual servers 234 includes allocating CPU and memory resources, starting up and shutting down virtual servers 234, and configuring network settings. Virtual machine resource management program 425 also communicates with one or more physical servers 232 or SVP service processor 231 to manage any raw physical servers, such as PS-008 in FIG. 2. Management of physical servers includes allocating CPU and memory resources, logical partitioning, starting up and shutting down virtual servers or virtual machine managers, and configuring network settings.

Information of the relationships between virtual machine managers 233, virtual servers 234 and physical servers 232 are stored in a virtual machine resource table 411 in disk 224c or memory 223c. Information on the mapping between virtual servers 234 and the VLAN is also stored in virtual machine resource table 411. The contents of virtual machine resource table 411 are described in additional detail below with reference to FIG. 7. Furthermore, information for translating a CPU performance index is stored in a CPU process time translation table 412 in disk 224c or memory 223c. The CPU performance index and contents of CPU process time translation table 412 are described further below with reference to FIG. 8.

Figures 5, 6:
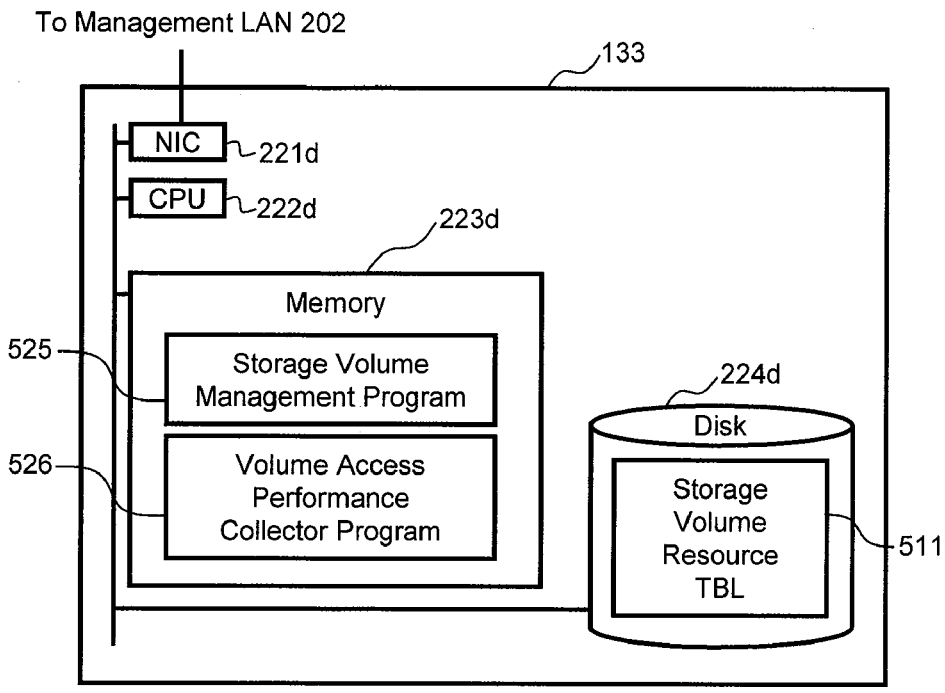
FIG. 5 illustrates an example of a storage management server.
FIG. 6 illustrates an exemplary data structure of a VPN resource table.

FIG. 5 illustrates additional details of the storage management server 133. NIC 221d connects storage management server 133 to the management LAN 202, and is used to send or receive command packets to or from integrated management system 111. Storage management server 133 also includes a storage volume management program 525 and a volume access performance collector program 526 in memory 223d or other computer readable medium, which is executed by CPU 222d. Storage volume management program 525 communicates with SAN switch 143 to configure the SAN setting, such as by configuring SAN switch 143. Storage volume management program 525 also communicates with storage 144 to obtain volume information on volumes 243. Information of relationships between disk array groups 242 and volumes 243, capacity of each volume 243, free space of each array group 242, mapping between servers 232, 234 and volumes 242, and volume access time are obtained by storage volume management program 525 and volume access performance collector program 526, and are stored in a virtual machine resource table 511 in disk 224d or memory 223d. The contents of storage volume resource table 511 are described further below with reference to FIG. 7.

VPN Resource Table

FIG. 6 illustrates the VPN resource table 311 that may reside in the network management server 131. VPN resource table 311 contains configuration information that VPN configuration program 325 uses to configure the VPN router 141a. VPN-ID 601 identifies which VPN virtual router (VR) that a site entry 602 corresponds to (e.g., customer site). Address 1 603 and Address 2 604 hold IP address values of each endpoint of a VPN path or tunnel, respectively (for example, the IP address of the customer site and the IP address of the virtual router, respectively). Bandwidth 605 indicates the network bandwidth value which is reserved in VPN router 141a to maintain a desired level of quality of service of the network connection between Address 1 603 and Address 2 604. VLAN-ID 606 is the VLAN tag value assigned to the packets received from this site over the VPN path.

Virtual Machine Resource Table

FIG. 7 illustrates the virtual machine resource table 411 that may reside in server management server 132. Virtual machine resource table 411 contains the configuration information that virtual machine resource management program 425 uses to manage servers 142. Virtual machine manager 701 identifies the platform of virtual machine software being used which carries out processes for creating, starting and stopping of virtual machine virtual servers. For example, VMM-001 711 might be a first brand of virtual machine management software, VMM-002 712 might be a second brand of virtual machine management software, and VMM-003 714 might be at third brand of virtual machine management software. Examples of virtual machine software currently used for virtual server applications include "VMware Server" available from VMware, Inc. of Palo Alto, Calif., "MS Virtual Server" available from Microsoft Corp. of Redding, Wash., and "XenServer" available from Citrix Systems of Ft. Lauderdale, Fla., although the invention is not limited to any particular virtual machine software. Further, if the value of the virtual machine manager 701 is "NON-VMM", as indicated at 716, this means that no virtualization mechanisms are used (i.e., the server is a raw physical server). According to FIG. 7, four virtual servers VM-101, VM-102, VM-103 and VM-104 are running on virtual machine manager VMM-001, two virtual servers VM-201 and VM-202 are running on virtual machine manager VMM-002, three virtual servers VM-301, VM-302 and VM-303 are running on virtual machine manager VMM-003. One server, PS-008, is running as a physical server without virtualization.

In virtual machine resource table 411, virtual server entry 702 identifies the virtual machines that currently exist in each virtual machine manager's environment. For example, VMM-001 711 includes four virtual machines currently running. Additionally, if some or all of virtual server entry 702 is indicated to be "Free", then this indicates the available capacity that a virtual machine manager can use to create additional virtual servers using available capacity of CPU 705 and memory 706. Physical server 703 identifies one or more physical servers which are used for realizing server virtualization by each virtual machine manager 701. CPU type 704 is a CPU type of each physical server 703. For example, different servers may have different CPUs installed, depending on age, initial purchase specifications, etc. CPU allocation 705 and memory allocation 706 indicate how much CPU processing capacity and memory resources are currently allocated to the virtual servers 702, respectively. Performance capacity 707 indicates the capacity for performance, which is a summed value of CPU allocation 705 of a corresponding virtual server 702. For example, VM-202, which is created and managed by VMM-002 712 is allotted 15 percent of the capacity of the CPU of physical server PS-005 and 20 percent of the capacity of physical server PS-006 for a performance capacity total of 35 percent of a CPU of CPU type CPU-001. VLAN-ID 708 is the VLAN tag value assigned to the corresponding virtual server 702. VLAN-ID 708 can be used by the resource manager program 122 to determine which servers are in the same VLAN, i.e., which servers are running an application. When a first data center (i.e., the Migration Requester) identifies requirements of an application to be migrated, as discussed below with reference to FIG. 13, the data center needs to identify which servers are included for that application.

CPU Process Time Translation Table

FIG. 8 illustrates CPU process time translation table 412, which may reside in the server management server 132. This table contains information that is used to translate a performance index depending on the virtual machine manager and CPU type so that an expected level of performance can be predicted for various CPU types and virtual machine manager software types in various servers. Virtual machine manager entry 801 identifies the software platform of virtual machine management software that carries out creating, starting and stopping of virtual servers. If virtual machine manager entry 801 is "NON-VMM", then this means no virtualization mechanisms are being used. CPU type 802 is the CPU type of a physical server. Performance index 803 is a comparative index of performance. The performance index values 803 set forth in FIG. 8 are representative of performance measured when a certain program (e.g., a benchmark) was run with a certain VMM and a certain CPU type. The performance of CPU types varies with the VMM even though the CPU type is the same, and the performance of the VMM varies depending on the CPU type. Therefore, it is necessary to translate performance by using this table to make sure that a requested performance level can be reserved for an application to be migrated. For example, at entry 811, the CPU type CPU-001 running VMM-001 carried out a certain benchmark test in a first period of time. At entry 812, CPU type CPU-002 running the same VMM-001 required 120 percent as much time to carry out the same benchmark test as CPU type CPU-001, and therefore has a performance index of 120. Similarly, at entry 817, CPU type CPU-001 running VMM-003 required only 65 percent as much time to carry out the benchmark test, and therefore has a performance index of 65. Thus, by compiling the CPU process time translation table 412, it is possible to estimate whether a physical server that is a target of migration will have sufficient processing capacity to run an application at a desired performance level. Further, while in the performance index illustrated, a larger index number indicates a lower performance relative to a benchmark score of a particular CPU type, it would also be possible to use other measuring schemes for determining relative CPU performance, such as determining ratios of processing power for various CPU types, or the like.

Storage Volume Resource Table

Figure 9:
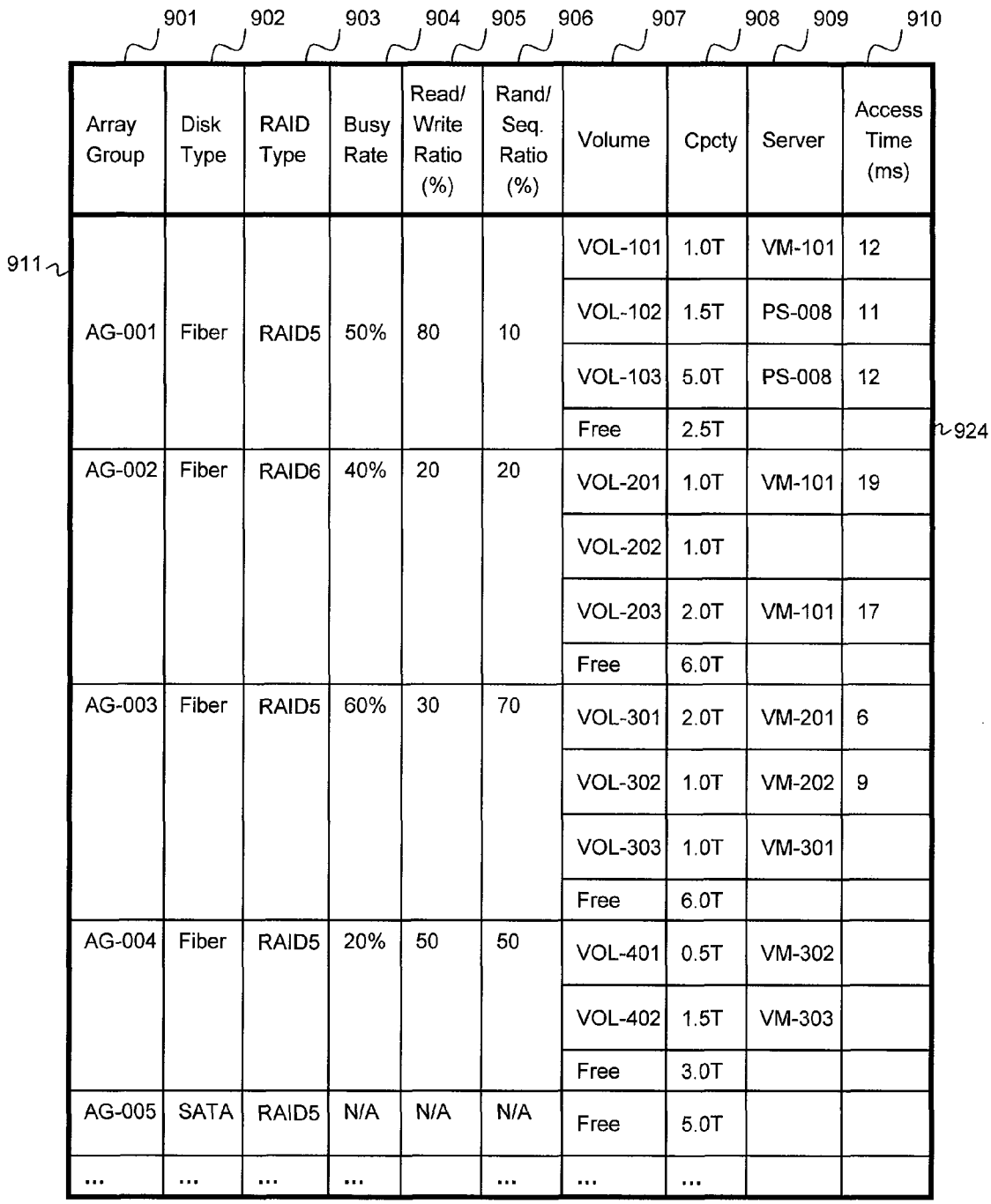
FIG. 9 illustrates an exemplary data structure of a storage volume resource table.

FIG. 9 illustrates storage volume resource table 411, which may reside in the storage management server 133. Storage volume resource table 411 contains configuration information that storage volume management program 525 uses to manage SAN switch 143 and storage 144. Array group entry 901 identifies the array group which is composed of plural storage media, such as disk drives. Disk type 902 indicates the kind of storage media that makes up each array group. RAID type 903 indicates the RAID level used in configuring each array group 901. Busy rate 904, Read/Write ratio 905 and Random/Sequential ratio 906 are statistical data of each array group 901 collected by storage volume management program 525. Busy rate 904 indicates how busy the particular array group is, for example, the percentage of time the array group is occupied performing I/O operations as measured over a period of time (e.g., I/O operations per second). Read/write ratio 905 is the ratio of the number of read access operations out of the total number of access operations measure over a period of time. Random/sequential ratio 906 is the ratio of random access counts out of total access counts, i.e., the number of accesses to disk that require random seeks, as opposed to sequential reads or writes, which can be an indication of high disk fragmentation. Further, it is desirable to have the same access characteristics for applications in the same array group. Thus, read/write ratio 905 and random/sequential ratio 906 can be used as specified criteria for determining a suitable recipient for application migration.

Volume entry 907 identifies the logical storage extents (i.e., logical volumes 234) that are currently carved from a particular array group. When the value of volume entry 907 is "Free", this means that the particular array group has available storage capacity for creating one or more new volumes. Capacity 908 is the capacity of the volumes listed in volume entry 907, or the available free capacity remaining. For example, in FIG. 9 at line 911, volumes VOL-101, VOL-102 and VOL-103 are carved from array group AG-001, and AG-001 has a free space for a new volume to be carved. In FIG. 9, volume VOL-101 has a capacity of 1.0 terabytes, and the remaining free capacity in array group AG-001 is 2.5 terabytes. Server entry 909 lists the virtual server or physical server that uses a particular volume identified in volume entry 907. For example, in FIG. 9, VOL-101 is able to be accessed by virtual server VM-101, and VOL-102 is able to be accessed by the physical server PS-008. From the server point of view, the virtual server VM-101 uses three volumes, namely VOL-101, VOL-201 and VOL-203. Access time 910 is a statistical data collected by the volume access performance collector program 526, and indicates an average performance value measured over time for how quickly the server is able to access the data on the particular volume.

Federated Data Center Table

FIG. 10 illustrates the federated data center table 213 that may reside in the integrated management system 111. The federated data center table 213 contains the data center information that the migration requester program 122 uses when making migration requests for determining to which data centers the migration requests should be sent. Data center ID 1001 is the identifier of each data center and request destination address 1002 is the destination address of the data center that is the target of the migration request. As discussed below, the migration requester program 122 sends a migration request document 13 to the request destination address 1002 for a data center listed in the federated data center table 213. The request is received by the migration acceptor program 121 at the target data center, and the migration acceptor program 121 prepares and responds with a suitable reply. Request priority entry 1003 set forth preference information to be used when the migration requester program makes 122 prepares a migration request, and is typically assigned by an administrator. For example, a data center having a higher priority would receive a migration request before other data centers having lower priorities.

Migration Request Received and Sent Tables

FIG. 11A illustrates the migration request received table 214 that may reside in the integrated management system 111. The migration request received table 214 contains the historical records of migration requests (i.e., migration request documents 13) that the migration acceptor program 121 has received at the data center maintaining the migration request table 214, and the results generated. ID 1101 is the identifier assigned to the migration request received (MRR). Requester origin entry 1102 identifies the data center that the migration acceptor program 121 received the request from. Date request was received 1103 records the date and time that the migration acceptor program 121 received the request from the other data center. Network result 1104, server result 1105 and storage result 1106 show the results of checking the capacity of the network, servers and storage in response to the migration request, as is discussed further below. Migration request contents 1107 includes the entire data of the migration request document 13 that the migration acceptor program 121 received.

FIG. 11B illustrates the migration request sent table 215 that may be maintained in the integrated management system 111 of each data center. The migration request table 215 is similar to migration request received table 214, discussed above, but contains the historical records of migration requests (i.e., migration request documents 13) that the migration requester program 123 has sent to other data centers. ID 1121 is the identifier assigned to the migration request sent (MRS). Request target 1122 identifies the data center that the migration requester program 123 sent the request to. Date request was sent 1123 records the date and time that the migration requester program 123 sent the request to the other data center. Network result 1124, server result 1125 and storage result 1126 show the results received back regarding whether the other data center was able to meet the requested capacity and performance for the network, servers and storage in response to the migration request, as is discussed further below. Migration request contents 1127 may contain the entire data of the migration request document 13 that the migration requester program 123 sent to the other data center.

Migration Request Document

Figure 12:
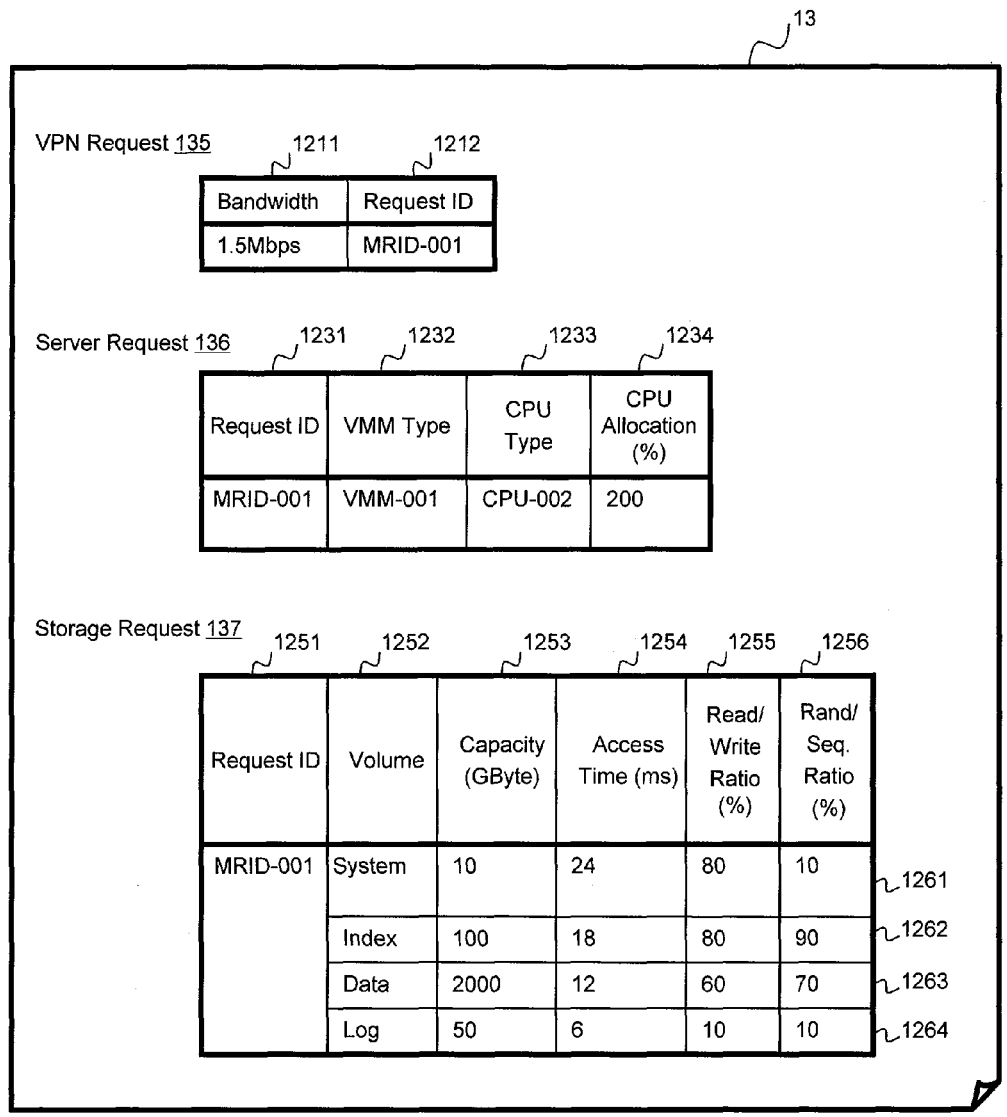
FIG. 12 illustrates an exemplary data structure of a migration request document.

FIG. 12 illustrates the migration request document 13 that migration requester program 123 creates and sends to initiate a migration request to another data center. Migration request document 13 consists of three parts: a VPN request part 135, a server request part 136 and a storage request part 137. VPN request part 135 has information on a requested network, including bandwidth 1211. In FIG. 12, bandwidth entry 1211 shows that a bandwidth of 1.5 Mbps is requested. Request ID entry 1212, 1231 and 1251 is a unique identifier for this particular migration request document. The request ID serves the role of connecting each request part 135, 136, 137 in the migration request document 13. Server request part 136 contains information on virtual machine manager type 1232, CPU type 1233 and CPU allocation 1234 requested. For example, FIG. 12 illustrates that VMM-001 is requested as the type 1232 of virtual machine manager, CPU-002 is requested as the CPU type 1233 and 200 percent is requested for CPU allocation 1234 (i.e., processing capacity equivalent to two CPUs of CPU type CPU-002 run on VMM-001). Minimum memory requirements (not shown) may also be specified by server request part 136 in some embodiments. Storage request part 137 includes information on requirements for each logical volume requested for migration. In FIG. 12, storage request part 137 has requirements 1261 to 1264 for four different volumes, namely a system volume, an index volume, a data volume and a log volume. Each request for a volume 1252 may include information of requested capacity 1253, access time 1254, read/write ratio 1255 and random/sequential ratio 1256. In other embodiments, however, some of these requirements may be not specified, or other requirements might be specified such a RAID type, disk type, busy rate, or the like.

Main Flowchart for Finding a Data Center for Migration

Figure 13:
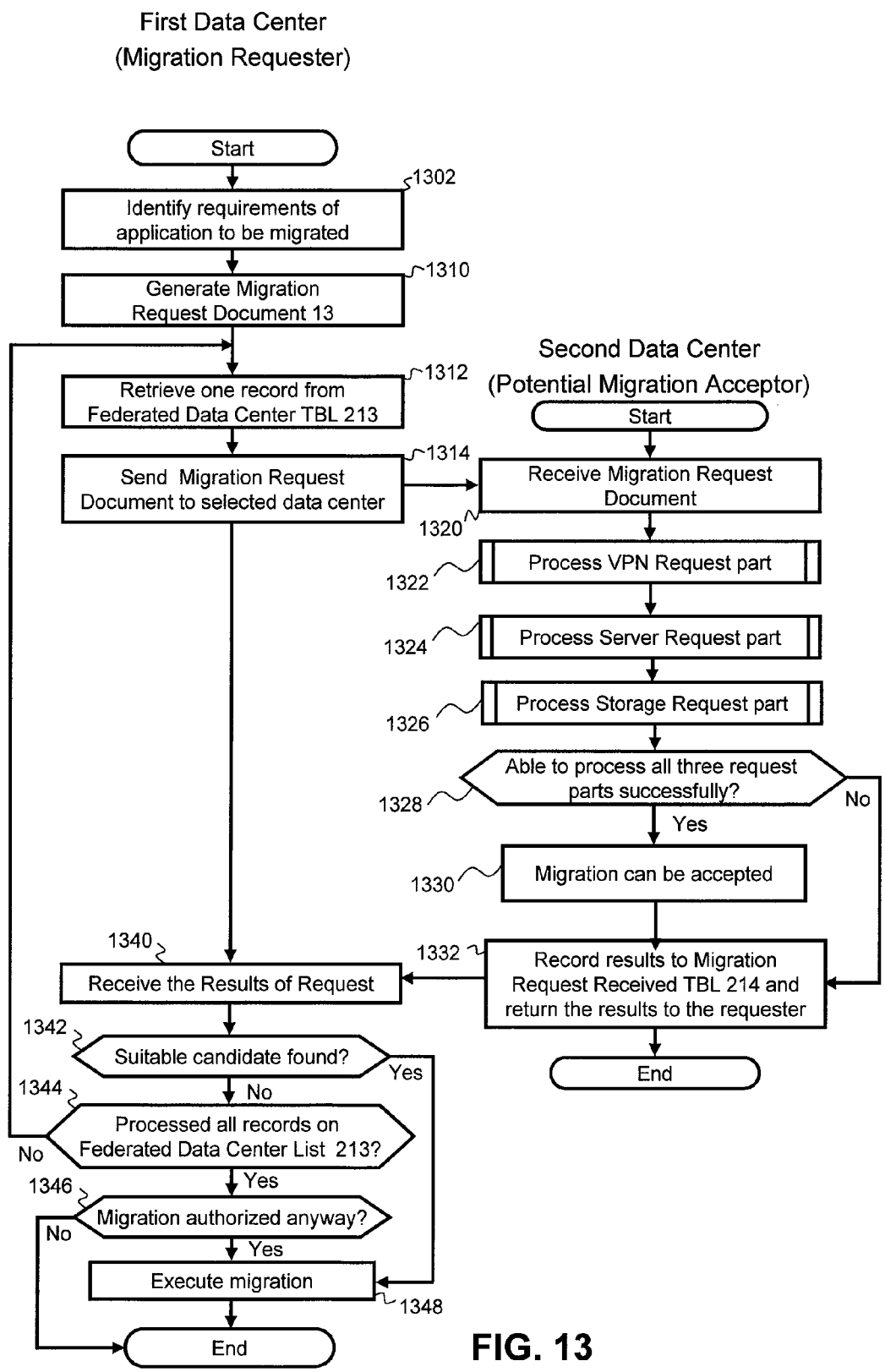
FIG. 13 illustrates an exemplary process flow of a process for locating an appropriate data center according to the invention.

FIG. 13 illustrates a flowchart that is representative of the integrated management system processing carried out in an exemplary embodiment of the present invention. In this flowchart, there are two data centers, a first data center is the migration requester and the second data center is a potential migration acceptor.

At step 1302, migration requester program 123 obtains data regarding the application that is to be migrated to another data center. The data obtained includes data on the network requirements, server requirements and storage requirements of the application. The requirements for the particular application may be determined by the migration requester program 123 by determining from VPN resource table 311, virtual machine resource table 411 and storage resource table 511 the resources currently being used by the particular application. Alternatively, the requirements may be supplied with an instruction that instructs the migration requester program 123 to initiate a migration request for the particular application.

At step 1310, migration requester program 123 in the first data center generates a migration request document 13 to attempt to find a suitable candidate data center to which to migrate an application.

At step 1312, migration requester program 123 retrieves a record from federated data center table 213 according to request priority value 1003 to select a destination data center to which to send the request for migration, and reads the corresponding value of the request destination address 1002. Alternatively, the migration requester program 123 might select all the data centers in the federated data center table, rather than proceeding according to the priority values.

At step 1314, migration requester program 123 sends migration request document 13 to the request address 1002 of the destination second data center that was read in step 1312.

At step 1320, migration acceptor program 121 of the second data center receives the migration request document 13 that was sent from migration requester program 123 of the first data center in step 1314, and invokes resource manager program 122 to determine if the migration request can be accepted.

At step 1322, resource manager program 122 processes the VPN request part 135 of migration request document 13, checks the VPN bandwidth capacity that is available at the second data center in comparison with the requested bandwidth, and returns the result to migration acceptor program 121. The details of the process of checking the VPN capacity are set forth below with reference to FIG. 14.

At step 1324, resource manager program 122 processes the server request part 136 of the migration request document 13 by checking available server capacity and performance in comparison with the requested capacity and performance, and returns the result to migration acceptor program 121. The details of the process of checking the server capacity are set forth below with reference to FIG. 15.

At step 1326, resource manager program 122 processes the storage request part 137 of the migration request document 13 by checking available storage capacity and performance in comparison with that requested, and returns the results to migration acceptor program 121. The detailed process for checking the storage capacity is set forth below with reference to FIG. 16.

At step 1328, migration acceptor program 121 receives the results of steps 1322, 1324 and 1326 and determine if the results for all three steps 1322, 1324, 1326 is "Yes", i.e., the requested capacity and performance levels can be satisfied.

At step 1330, if the result for all three steps 1322, 1324, 1326 is "Yes", then migration can be accepted at the requested levels.

At step 1332, migration acceptor program 121 records the requester, current date and time, and enters the results of steps 1322, 1324 and 1326 in network result 1104, server result 1105 and storage result 1106, respectively, in migration request received table 214 of FIG. 11A, and also enters the contents of the migration request document 13 in migration request contents 1107. Migration acceptor program 121 then returns the results to the migration requester at the first data center.

At step 1340, migration requester program 123 at the first data center receives the results from the migration acceptor program at the second data center and enters the results in the migration request sent table 215 of FIG. 11B, by entering the results of steps 1322, 1324 and 1326 in network result 1124, server result 1125 and storage result 1126, respectively.

At step 1342, migration requester program 123 checks whether all three results are "Yes" for network result 1124, server result 1125 and storage result 1126. If so, then a suitable candidate data center has been found for migration of the application and the process skips to step 1348. On the other hand, if one or more of the results are "No", the process goes to step 1344 to determine whether there is another data center that might meet the requested levels. Further, while the process has been described as returning only "Yes" or "No" results, the process could instead return actual capacity values.

At step 1344, if a suitable candidate has not yet been found, migration requester program 123 checks whether it has reached the end of the records listed in federated data center table 213 (i.e., a request has been sent to all other data centers). When the end of the records is not yet reached, migration requester program 123 returns to step 1312 and selects the next data center listed in federated data center table 213.

At step 1346, when no suitable candidate data center has been located from all the data centers listed in the federated data center table 213, the process may send a request to an administrator inquiring as to whether migration should take place to one of the other data centers anyway. For example, if migration is necessary, an administrator may instruct migration to be carried out, even though some requirements of the migration request document are not met. For example, a data center which has sufficient storage and processing might be selected to receive migration even if network bandwidth is insufficient. This step might be particularly suitable in a case where the results returned show the actual capacity values, rather than just "Yes" or "No" results, thus making judgment decisions by the administrator more precise.

At step 1348, migration of the application is carried out by sending migration request document 13 to the determined second data center for instructing migration to take place. The second data center creates new volumes, copies data to these new volumes, creates new virtual servers or assigns physical servers, configures SAN switch, VLAN and VPN, boots up these servers, and, along with the first data center, completes any other necessary steps for carrying out the migration of the application.

Flowchart for Available VPN Bandwidth Confirmation

Figure 14:
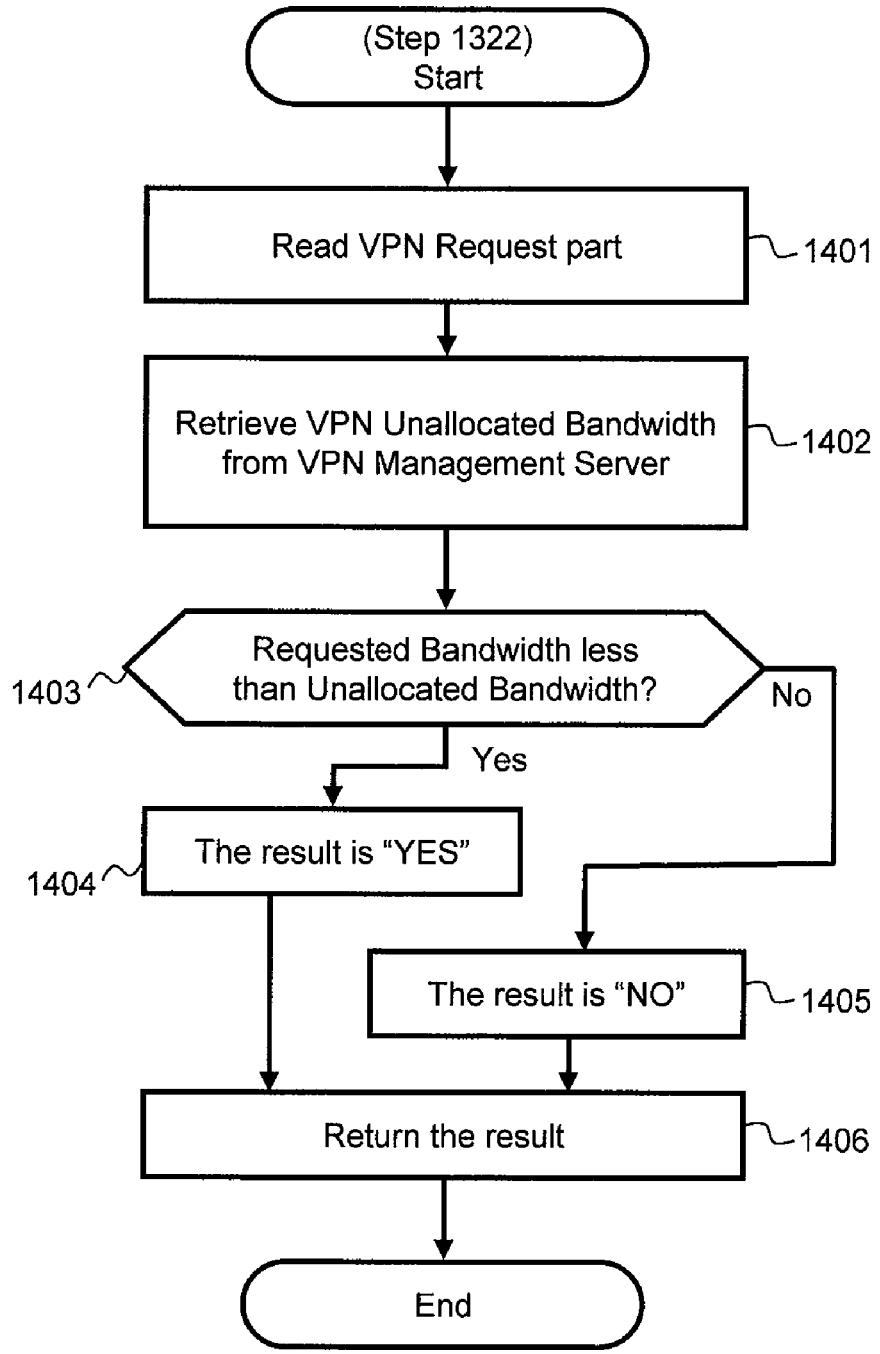
FIG. 14 illustrates an exemplary process flow for checking available bandwidth.

FIG. 14 illustrates an exemplary detailed flowchart of step 1322 from the process of FIG. 13 for checking the VPN free bandwidth with respect to VPN request part 135 of migration request document 13.

At step 1401, resource manager program 122 reads VPN request part 135 from migration request document 13.

At step 1402, resource manager program 122 retrieves VPN unallocated bandwidth from VPN resource table 311 in VPN management server 131, by determining the amount of bandwidth 605 that is "Free".

At step 1403, resource manager program 122 compares the available unallocated bandwidth with the amount of bandwidth requested in VPN request part 135. If the available free bandwidth value is larger than or equal to the requested bandwidth amount, the process goes to step 1404; if not, the process goes to step 1405.

At step 1404, resource manager program 122 sets the result as "YES".

At step 1405, resource manager program 122 sets the result as "NO".

At step 1406, resource manager program 122 returns the result from step 1404 or 1405 to migration acceptor program 121. For example, in FIG. 6, unallocated bandwidth is 2.0 Mbps. The requested bandwidth in FIG. 12 is 1.5 Mbps. So in this example, the result returned by step 1406 is "YES". Further, while the invention has been described in the environment of a VPN, the invention may also be applied in a non-virtual network environment. For instance, a VPN is one example of network equipment capable of providing a specified quality of service to an application. Thus, a feature of the invention includes that the network performance of applications can be essentially guaranteed prior to determining whether to migrate an application. Accordingly, other network equipment may be used in place of the VPN, such as by using a suitable mechanism for providing a predictable available bandwidth, and the like.

Flowchart for Checking Available Server Capacity/Performance

Figure 15:
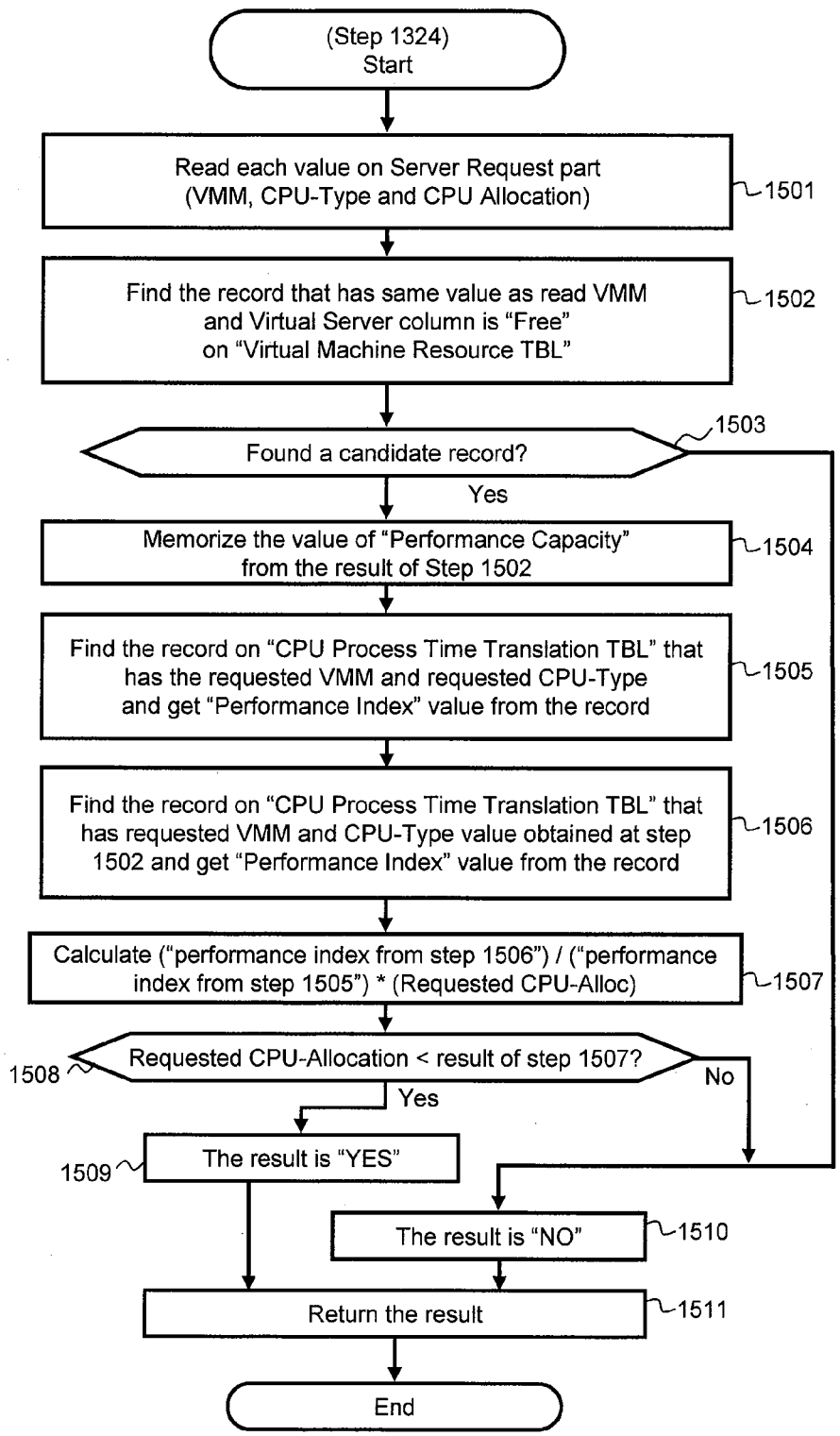
FIG. 15 illustrates an exemplary process flow for server available capacity confirmation.

FIG. 15 illustrates an exemplary detailed flowchart of step 1324 of FIG. 13 for checking the available server capacity and performance with the respect to server request part 136 of migration request document 13.

At step 1501, resource manager program 122 reads each value on server request part 136, i.e., requested virtual machine manager 1232, CPU type 1233 and CPU allocation 1234. For example, according to FIG. 12, the server request is "VMM-001" for virtual machine manager, "200%" of CPU allocation on CPU type "CPU-002".

At step 1502, resource manager program 122 searches virtual machine resource table 411 for a record that has the same value as the specified VMM and where virtual server column 702 includes a "Free" entry.

At step 1503, if one or more candidate records are found in step 1502, the process goes to step 1504. On the other hand, if no records are located that meet the requirements of step 1502, the process goes to step 1510. For example, according to FIG. 7, table 411 has a record of "VMM-001" for virtual machine manager and an entry of "Free" in a corresponding virtual server column 702, so the result of step 1503 would be "Yes" in this example.

At step 1504, resource manager program 122 obtains the value of the performance capacity 707 for the record located in step 1502. For example, according to FIG. 7, the amount of free performance capacity is "185".

At step 1505, resource manager program 122 searches for a record in CPU process time translation table 412 that has the requested virtual machine manager (i.e., VMM-001 in the example of FIG. 12) and requested CPU-type (i.e., CPU-002 in the example of FIG. 12), and obtains the corresponding performance index value 803 for the record. For example, according to FIG. 8, the performance Index value for "VMM-001" and "CPU-002" is "120".

At step 1506, resource manager program 122 searches for a record in CPU process time translation table 412 that has the requested virtual machine manager and the CPU type located in step 1502, and obtains the corresponding performance index value 803 from the record. For example, according to FIG. 8, performance index value for "VMM-001" and "CPU-001" is "100".

At step 1507, resource manager program 122 normalizes the requested performance index by calculating according to the following formula: ("The value obtained in step 1506")/("The value obtained in step 1505")*("requested CPU allocation"). In the example of FIG. 12 this calculation is (100/120)*200=167.

At step 1508, resource manager program 122 compares the normalized performance index with the free performance capacity 707 in virtual machine resource table 411. If the free performance capacity 707 in virtual machine resource table 411 is larger than the normalized performance capacity requested, then the process goes to step 1509; if not, the process goes to step 1510. In the example, "185">"167", so the result is "Yes".

At step 1509, resource manager program 122 sets the result as "YES".

At step 1510, resource manager program 122 sets the result as "NO".

At step 1511, resource manager program 122 returns the result to migration acceptor program 121. Thus, it may be seen that the invention provides for automatically matching requested performance capacities for servers across different hardware and software platforms. Accordingly, a feature of the invention includes that the server performance of applications can be essentially guaranteed prior to determining whether to migrate a particular application.

Flowchart for Checking Available Storage Capacity/Performance

Figure 16:
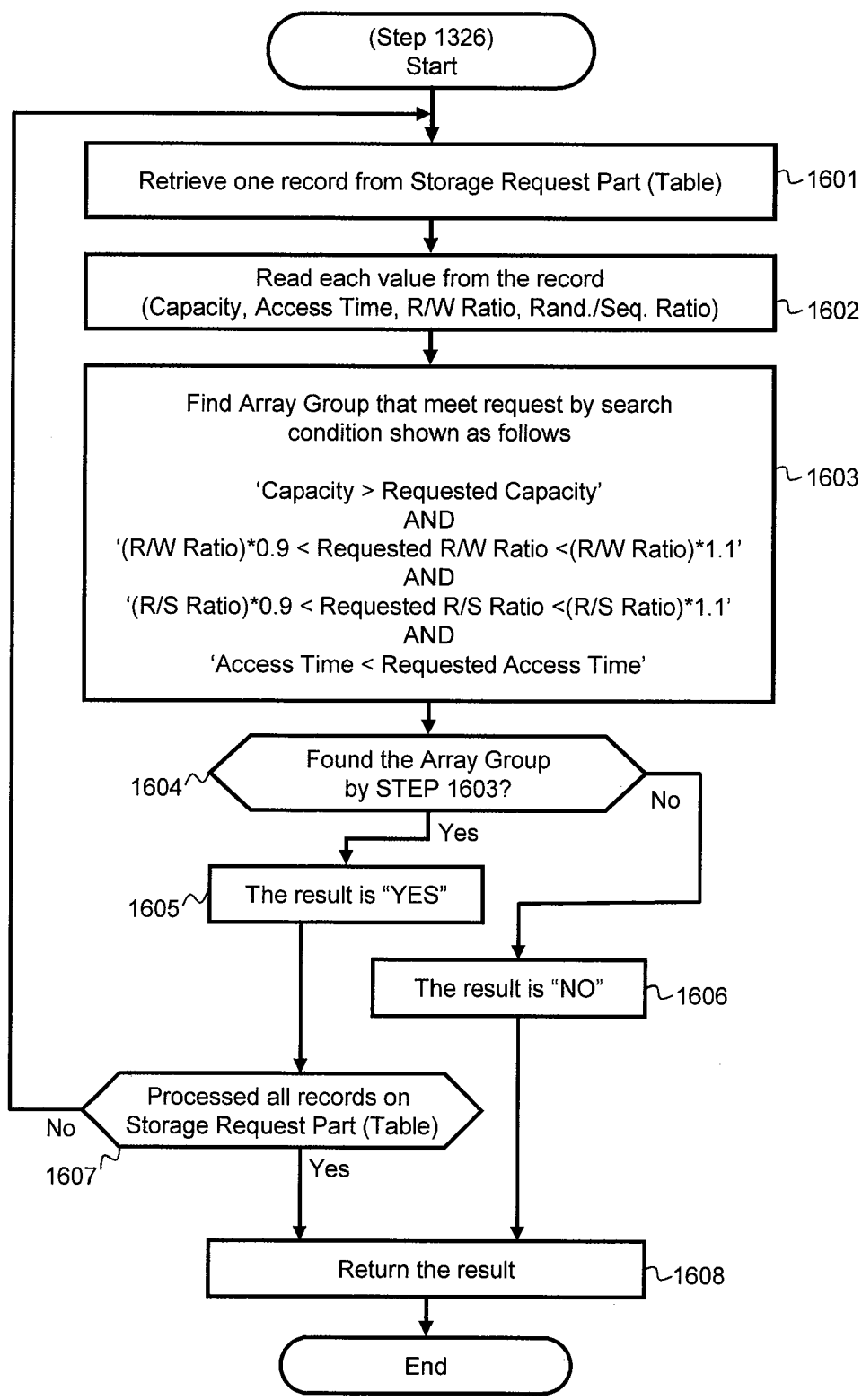
FIG. 16 illustrates an exemplary process flow for storage available capacity and performance confirmation.

FIG. 16 illustrates an exemplary detailed flowchart of step 1326 of FIG. 13 for checking the available storage capacity and performance with respect to storage request part 137 of migration request document 13.

At step 1601, resource manager program 122 retrieves one of records 1261-1264 from storage request part 137 for processing the requests for each specified volume individually.

At step 1602, resource manager program 122 reads each value from the record, i.e., capacity 1253, access time 1254, read/write ratio 1255 and random/sequential ratio 1256.

At step 1603, resource manager program 122 searches for an array group in the data center that meets requested values read in step 1602 for particular volume. A suitable array group from which to carve the volume may be located using the following formula:

(Capacity>Requested Capacity)

AND (Read/Write Ratio*0.9)<Requested Read/Write Ratio<(Read/Write Ratio*1.1)

AND ((Ran./Seq. Ratio*0.9)<Requested Ran./Seq. Ratio<(Ran./Seq. Ratio*1.1))

AND (Access Time<Requested Access Time)

For instance, according to the example of FIG. 12, the storage request for system volume record 1261 specifies a requested capacity 1253 of "10 GB", a requested access time 1254 of "24 ms", a requested read/write ratio of "80%", and a requested random/sequential ratio of "10%". Searching the records in storage volume resource table 511 shows that record 924 meets the requested requirements for the system volume. The above formula includes tolerance factors "0.9" and "1.1" which are included in the formula to make it easier to find a match for the volume request. For example, in some applications, it is not so important that the read/write ratio and the random/sequential ratio be a specific number, so long as they are within an approximate range. The use of these tolerance factors allows this flexibility.

At step 1604, if array group that is able to meet the requested requirements for the volume is found, the process goes to step 1605; if not, the process goes to step 1606.

At step 1605, resource manager program 122 set the result as "YES".

At step 1606, resource manager program 122 set the result as "NO".

At step 1607, resource manager program 122 checks whether the end of all the records in storage request part 137 has been reached. If all the records have been processed, the process goes to step 1608; if not, then the process goes back to step 1601 to process the next record in the storage request part 137.

At step 1608, resource manager program 122 returns the results to migration acceptor program 121. Accordingly, a feature of the invention includes that the storage performance of applications can be essentially guaranteed prior to determining whether to migrate an application, and that various different performance metrics or values may be specified for an application, depending on the type and requirements of the particular application.

Thus, it may be seen that the invention is able to automatically locate an appropriate target data center from among multiple data centers for receiving migration of an application, while also maintaining that application's performance levels. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A system comprising:
a plurality of information systems including a first information system and a second information system, the plurality of information systems each including a network apparatus, one or more servers, and one or more storage systems, the plurality of information systems being in communication with each other via a network;
wherein the first information system sends a migration request of an application to the second information system of the plurality of information systems, the migration request specifying server requirements,
wherein the second information system compares a type of a first Virtual Machine Manager (VMM) set forth in the server requirements with a type of a second VMM having available processing capacity at the second information system to determine whether the second information system has the sufficient free capacity to satisfy the server requirements, and
if the second information system has the sufficient free capacity to satisfy the server requirements, the first information system migrates the application to the second information system.

2. The system according to claim 1,
wherein the second information system compares the type of the first VMM with the type of the second VMM in order to estimate a performance of the second VMM to which the application is migrated.

3. The system according to claim 1,
wherein the server requirements further specify a processing capacity of a CPU type, and
wherein the second information system determines whether the second information system has the sufficient free capacity to satisfy the server requirements by comparing a type of a first CPU set forth in the server requirements with a type of a second CPU having available processing capacity at the second information system.

4. The system according to claim 3,
wherein the second information system compares the type of the first VMM with the type of the second VMM by comparing a first performance value of the first VMM evaluated based on the type of the first VMM and the type of the first CPU with a second performance value of the second VMM evaluated based on the type of the second VMM and the type of the second CPU.

5. The system according to claim 1,
wherein the migration request further specifies network requirements which having a minimum bandwidth of a virtual private network (VPN), and
wherein the second information system determines whether the second information system has the sufficient free capacity to satisfy the network requirements by comparing the minimum bandwidth set forth in the network requirements with available bandwidth exists in the network apparatus at the second information system.

6. The system according to claim 1,
wherein the migration request further specifies storage requirements which having a required capacity and attributes of one or more volumes to be created in the second information system, and
wherein the second information system determines whether the second information system has the sufficient free capacity to satisfy the storage requirements by comparing the required capacity and the attributes of the volumes with a capacity and attributes of the volumes in the second information system.

7. A method for migration of an application in a system, wherein the system has a plurality of information systems including a first information system and a second information system, the plurality of information systems each including a network apparatus, one or more servers, and one or more storage systems, plurality the information systems being in communication with each other via a network, the method comprising the steps of:
sending a migration request of the application to the second information system of the plurality of information systems, the migration request specifying server requirements;
comparing a type of a first Virtual Machine Manager (VMM) set forth in the server requirements with a type of a second VMM having available processing capacity at the second information system to determine whether the second information system has the sufficient free capacity to satisfy the server requirements; and
if the second information system has the sufficient free capacity to satisfy the server requirements, migrating the application from the first information system to the second information system.

8. The method according to claim 7,
wherein in the comparing step, the second information system compares the type of the first VMM with the type of the second VMM in order to estimate a performance of the second VMM to which the application is migrated.

9. The method according to claim 7,
wherein the server requirements further specify a processing capacity of a CPU type, and
wherein in the comparing step, the second information system determines whether the second information system has the sufficient free capacity to satisfy the server requirements by comparing a type of a first CPU set forth in the server requirements with a type of a second CPU having available processing capacity at the second information system.

10. The method according to claim 9,
wherein in the comparing step, the second information system compares the type of the first VMM with the type of the second VMM by comparing a first performance value of the first VMM evaluated based on the type of the first VMM and the type of the first CPU with a second performance value of the second VMM evaluated based on the type of the second VMM and the type of the second CPU.

11. The method according to claim 7,
wherein the migration request further specifies network requirements which have a minimum bandwidth of a virtual private network (VPN), and
wherein the second information system determines whether the second information system has the sufficient free capacity to satisfy the network requirements by comparing, in the comparing step, the minimum bandwidth set forth in the network requirements with available bandwidth existing in the network apparatus at the second information system.

12. The method according to claim 7,
wherein the migration request further specifies storage requirements which have a required capacity and attributes of one or more volumes to be created in the second information system, and
wherein the second information system determines whether the second information system has the sufficient free capacity to satisfy the storage requirements by comparing, in the comparing step, the required capacity and the attributes of the volumes with a capacity and attributes of the volumes in the second information system.

* * * * *